United States Patent [19]

Yang et al.

[11] 4,393,550

[45] Jul. 19, 1983

[54] SAFETY CLASP FOR THE STRING OF FOOTWEAR

[76] Inventors: James Yang; James M. F. Chen, both of No. 206, Li Hsing Rd., Taichung City, Taiwan

[21] Appl. No.: 255,369

[22] Filed: Apr. 20, 1981

[51] Int. Cl.³ .............................................. F16G 11/00
[52] U.S. Cl. .................................... 24/117; 24/115 G
[58] Field of Search .................... 24/117 R, 119, 120, 24/115 G, 115 L

[56] References Cited

U.S. PATENT DOCUMENTS 3,845,575  11/1974  Boden ................................ 24/117 R
4,112,551   9/1978  Sales ................................. 24/117 R

FOREIGN PATENT DOCUMENTS 641586  2/1937  Fed. Rep. of Germany ... 24/115 G
244030  4/1947  Switzerland ..................... 24/117 R Primary Examiner—Jay N. Eskovitz Attorney, Agent, or Firm—Lackenbach, Siegel, Marzullo, Presta & Aronson

[57] ABSTRACT

Safety clasp for the string of the footwear comprises a fastening member and a knot member having a lower portion, an extending portion and a head, the fastening member comprising a tube having two bores, a compression spring within the tube, two pins at both ends of the tube each having a bore corresponding to that of the tube, and a mount having a perforation corresponding to the head and the extending portion in cross section so as to detachably receive the knot member thereupon, whereby a permanent and adjustable knot is obtainable by: passing one free end of the string of the footwear through the bores of the tube and those of the pins; second, passing the other free end thereof correspondingly in the same manner as the first step; finally, passing both free ends thereof in an opposite direction through the hole of the lower portion of the knot member.

2 Claims, 3 Drawing Figures

SAFETY CLASP FOR THE STRING OF FOOTWEAR

BACKGROUND OF THE INVENTION

This invention relates to a safety clasp for the string of the footwear, by means of which a permanent and adjustable knot is obtainable.

A knot is required to hold firm the footwear such as shoe, boot, and particularly gym shoe. Equally required is the step to untie the knot whereby the footwear may be put off. Conventionally, the knot has a duration no more than once. Thus, where there is no permanent and adjustable knot, there will be inconvenience. This invention is an improvement of a Republic of China Application No. 6522926, filed Aug. 11, 1976; and it is our belief that your device including said improvement invention can perform well to produce a permanent and adjustable knot for footwear fastened by means of string as can the present invention.

SUMMARY OF THE INVENTION

This invention relates to a safety clasp for the string of footwear, by means of which a permanent and adjustable knot is obtainable.

Accordingly, one object of the invention is to provide a safety clasp which may produce a permanent and adjustable knot for the footwear fastened by means of string. An embodiment of the present invention will be further described with reference to the accompanying drawings, the description being given by way of example only, not by way of limitation.

DETAILED DESCRIPTION OF THE INVENTION

Figure 1:
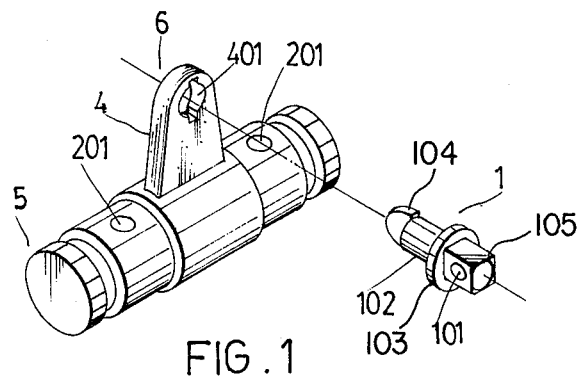
FIG. 1 is an exploded perspective view of an embodiment according to the present invention.

As shown in FIG. 1, a knot member 1 has a lower portion 105, a protuberance 103, an extending portion 102 and a head 104. The base of the head 104 intersects substantially in half the circle of the extending portion 102 in cross section and thus is centrally located. The front view of the head 104 is preferably circular or in the shape of an arrowhead. The lower portion 105 is transversely perforated with a hole 101 which barely admits two strings to pass therethrough. In cross section, the protuberance 103 is greater than the lower portion 105 and the extending portion 102.

Figure 2:
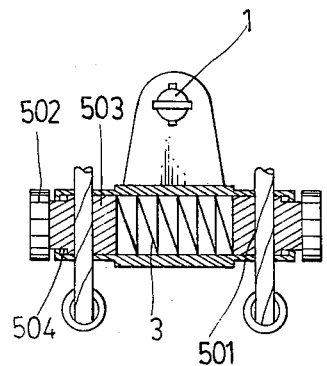
FIG. 2 is a longitudinal sectional view of the embodiment according to the present invention, wherein the free ends of the string pass through the string passages constituted by the bores of the tube and those of the pins.
Figure 3:
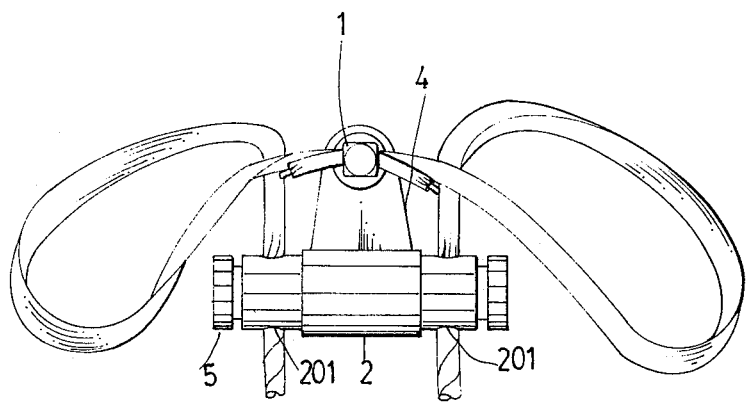
FIG. 3 is a schematic view showing a knot produced by the embodiment according to the present invention.

As shown in FIGS. 1 and 2, a fastening member 6 comprises a tube 2 having two bores 201, a compression spring 3 within the tube 2, two pins 5 at both ends of the tube 2 each having a bore 501 corresponding to that of the tube 2, a mount 4 having a perforation 401 for said knot member 1 to be detachably received thereupon. The bores 201 of the tube 2 are separated from each other by the mount 4. The mount 4 and the tube 2 may be molded in a solid body. As shown in FIGS. 1, 2 and 3, the mount 4 is perpendicular to the tube 2. The perforation 401 in cross section is formed by a circle slightly larger than the extending portion 102 in cross section and two ends of an oblong plane substantially extend through the the center of the perforation 401 in cross section, and such oblong plane is slightly larger than the base of the head 104. In combination, the knot member 1 is detachably received upon the mount 4 by inserting the head 104 through the perforation 401. The knot member 1 is detachable from the mount 4 by adjusting the head 104 in alignment with the two ends of the perforation 401. The knot member 1 is stopped where the protuberance 103 meets the mount 4. It is to be noted that in another preferable embodiment of the knot member 1, made according to the present invention, it is not necessary to provide a protuberance 103; and in such a case, the lower portion 105 in cross section is greater than the extending portion 102 is in cross section. As shown in FIG. 3, the knot member 1 rests perpendicular to the mount 4. Each pin 5 has a head 502, an extending portion 503, and a neck portion 504 in addition to a bore 501. The tube 2 extends with both ends slightly contracted whereby the extending portions 503 of the pins 5 is hidden therein and the heads 502 thereof exposed outside. Each pin 5 pressed against the inner circumferential edge of the end of the tube 2 by the compression spring 3 is longitudinally movable through the opening end of the tube 2; each pin 5 under the pressure exerted by the fingers may move the distance defined by the length of the neck portion 504. Each bore 201 of the tube 2 barely admits a string to pass therethrough, and so does each bore 501 of the pin 5. A passage for a string to pass through is obtainable by adjusting a bore 201 of the tube 2 in alignment with a corresponding bore 501 of the pin 5. On removal of the pressure exerted by the fingers on the heads 502, the compression spring 3 will press the pin 5, thus effecting a griping force for the string.

According to the present invention, a durable and adjustable knot is obtainable by: first, passing one free end of the string of the footwear through the bores 201 of the tube 2 and the bores 501 of the pins 5; second, passing the other free end thereof correspondingly in the same manner as the first step; finally, passing both free ends of the string in an opposite direction through the aperture or hole 101 of the knot member 1. Each free end of the string may be further crossed with itself to make a knot for the sake of obtaining higher safety. The knot as shown in FIG. 3 is obtainable by respectively drawing the free ends of the string or sliding the fastening member 6 along two halves of the string.

As many apparently widely different embodiments of this invention may be made without departing from the spirit and scope thereof, it is to be understood that the invention is not limited to the specific embodiments thereof except as defined in the appended claims.

What I claim is:

1. A safety clasp for the string of footwear comprising a fastening member and a knot member, said knot member having a lower portion transversely perforated with a hole, an extending rod portion, and a flat protruding head the height of which is larger than the diameter of said extending rod portion, said extending rod portion being between said lower portion portion and said flat protruding head; said fastening member comprising a tube having two bores, a compression spring within said tube, a pin at each end of said tube biased by said spring, and each pin having a bore substantially corresponding in size to said bore of said tube, and a mount perpendicular to said tube, said mount having a shaped perforation corresponding in size to the thickness of said flat protruding head and to the diameter of said extending rod portion so as to receive said flat protruding head and extending rod portion of said knot member therethrough as in the form of a keyed rod, whereby a knot is obtained by passing the opposite ends of said string of the footwear through the aligned bores of said tube and said pins upon said pins being depressed in said tube and further passing said ends in an opposite direction through the perforation in said lower portion of said knot member, and still further inserting said head of said knot member through the perforation of said mount; and said knot member being detachable from said mount by adjusting said flat protruding head in alignment with said shaped perforation of said mount.

2. A safety clasp for the string of footwear as claimed in claim 1, further comprising a flange-like protuberance between said lower portion and said extending rod portion.

* * * * *